UNITED STATES PATENT OFFICE.

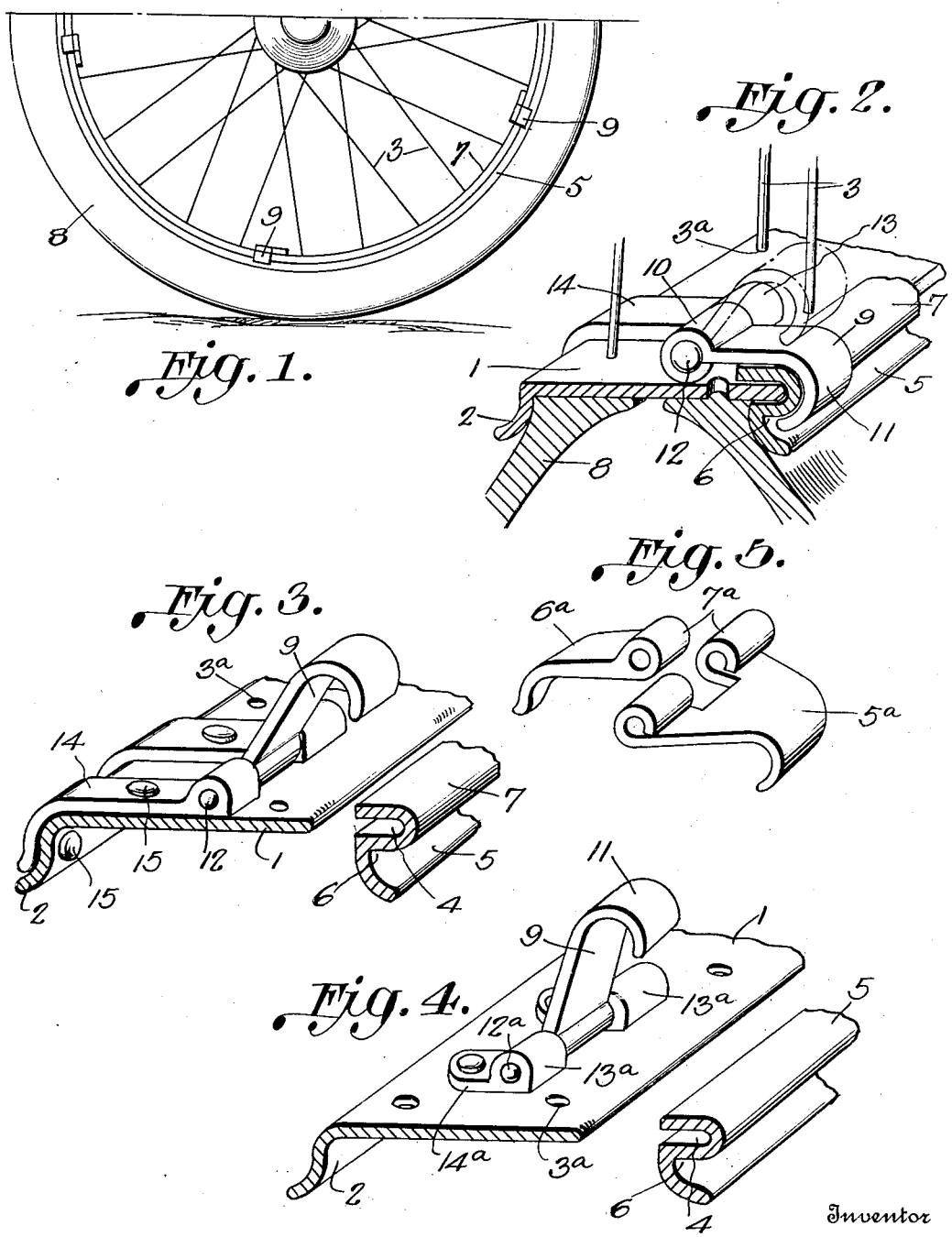

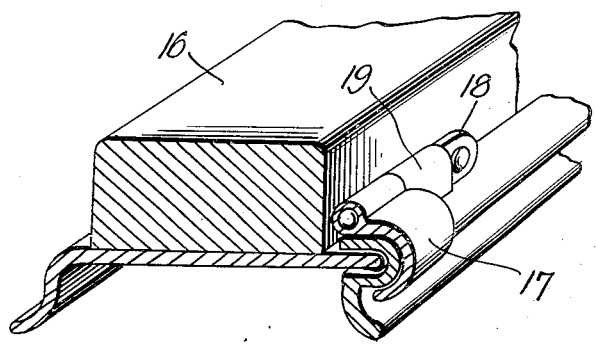
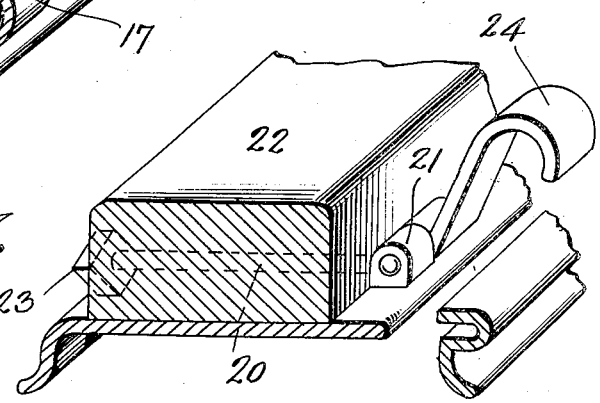
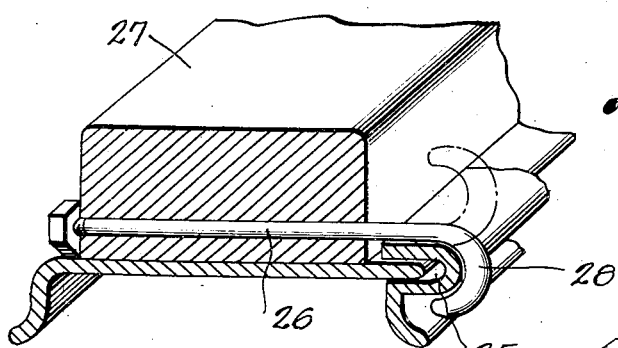
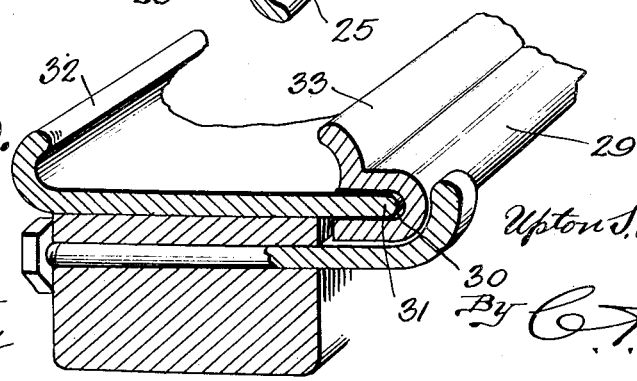

UPTON S. LANDERS, OF BAKERSFIELD, CALIFORNIA.

RIM AND CLAMPING DEVICE FOR PNEUMATIC TIRES.

1,363,884.  Specification of Letters Patent.  Patented Dec. 28, 1920.

Application filed October 9, 1919. Serial No. 329,570.

*To all whom it may concern:*

Be it known that I, UPTON S. LANDERS, a citizen of the United States, residing at Bakersfield, in the county of Kern and State of California, have invented certain new and useful Improvements in Rims and Clamping Devices for Pneumatic Tires, of which the following is a specification.

This invention relates to automobile tires and pertains especially to rim construction and to devices for connecting a two-part rim and for clamping to the wheel rim.

The object of the invention is to provide a two part rim, one part slidable transversely into the other part, for clamping a pneumatic tire, and to furnish means for clamping said parts together so as to permit relative expansion and contraction of said parts in a tire mounting and demounting operation.

A further object of the invention is to provide a side rim member of peculiar shape adapted to be clamped to a main rim member so as to be expeditiously removed and replaced in a mounting and demounting operation, and affording means for permitting transverse movement of the side rim member with respect to the main rim member during expansion and contraction of the tire.

A still further object of the invention is to provide novel and peculiar means, mounted on the main rim member of an automobile wheel, for clamping a side rim member to the main or base rim member so as to afford an interval or space between the said rim members for lateral movement of said members during inflation of a tire, whereby such tire is demountably held between flanges of said members.

A still further object of the invention is to provide novel and peculiar rim clamping devices, and means for securing such devices to the inner periphery of a pneumatic tire rim, whereby said devices may be hand-operated for clamping and releasing a tire in a mounting and demounting operation.

Various other objects, advantages and improved results are attainable in the manufacture and practical application of the invention as will be hereinafter fully set forth.

In the accompanying drawings forming part of this application:

Figure 1 is a side elevation of part of a wire spoked wheel showing the application of the invention.

Fig. 2 is a sectional perspective view of part of a wheel rim showing the parts in position preparatory to applying and inflating a tire, the dotted lines showing the movement of the clamping device.

Fig. 3 is a similar view showing part of an inflated tire as clamped in position.

Fig. 4 is a sectional perspective view of part of the rim members showing modified means for attaching the clamping device.

Fig. 5 is a perspective view of a modified form of clamping dog.

Figs. 6, 7, 8 and 9 are similar views of further modifications.

The same reference characters denote the same parts throughout the several views of the drawings.

In carrying out my invention, I employ a main or base rim member 1 having a side edge flange 2, and as shown in Figs. 1, 2 and 3 of the drawings, said rim member has the usual wire spokes 3, and spoke holes 3ª. The side edge of said rim member opposite said flange is made without a flange so as to fit within an annular socket or U-shaped groove 4 of a supplemental circular side rim member 5 which is preferably substantially S-shaped in cross section, and has an annular undercut groove 6, and an outwardly protruding bearing surface 7 opposite the groove 4, and opposite the flangeless edge of the main member 1 when the said edge is in the socket or groove 4. The supplemental rim member 5 has a flaring flange corresponding with the flange 2, and these flanges form side abutments for a pneumatic tire as 8.

One of the essential features of my invention resides in the device for clamping the side rim member 5 to the main rim member 1, and as shown in Figs. 1, 2 and 3 of the drawings, said device comprises a swinging dog 9 having a pin or trunnion bearing 10, and a semicircular hooked free end 11 fitting the bearing surface 7 of the supplemental side rim member 5 so as to have said end engage the protruding portion of the rim member 5 within the undercut groove 6. The hinge members of the clamping device comprise a trunnion or hinge pin 12 upon which the dog is pivoted, and said pin extends through eye heads 13 of arms 14 which have a curved end conforming with and engaging the main rim flange 2. The arms may be suitably secured to the inner periphery of the rim members 1, preferably by rivets 15, and said arms are arranged to extend between the wheel spokes so that the dog may be operated between the heads 13 and between the spokes, in attaching and releasing the side rim member 5 for mounting and demounting a tire. As shown in Fig. 4, in lieu of the hinge pin, the pivot end of the dog may have short trunnions 12ª working in the heads 13ª, which have securing ears 14ª, or as shown in Fig. 5 the clamping members 5ª and 6ª may be hinged together as at 7ª. The interval or space between the hooked end of the clamping dog and the edge of the main rim member 1 is not only sufficient to accommodate the protruding portion of the side rim member 5, but the arrangement or pivot mounting of the dog relative to the flangeless edge of the rim member 1 is such as to permit lateral or relative transverse movement of said members during inflation of a tire. That is to say there is a tire take-up space between said members so that during the inflation the said members are forced outwardly, with the rim member 5 abutting against the dogs, which, obviously are distributed, as desired, throughout the rim, while the arms 14 are likewise distributed so as to support and brace the rim flange 2. By reason of the take-up space between the rim members, the free end of the dog hook being pressed or forced against the flange protrusion forces the rim members inwardly temporarily or until the said hook has passed over the protrusion into full engagement therewith, then when a tire is placed in position, the inflation or expansion thereof forces the rim members apart to the extent of the take-up space.

In applying the clamping device to a wooden felly 16 as shown in Figs. 6 and 7 of the drawings, the clamping hook 17 is anchored to the side of the felly either by ears 18 projecting from eye heads 19 and secured to the felly 16 as shown in Fig. 6, or (as shown in Fig. 7) by bolts 20 projecting from eye-heads 21 and extending transversely through the felly 22 and provided with a suitable nut 23, so as to hold the hook 24 in swinging position for engaging the same form of movable side rim member as shown in Figs. 1, 2, 3 and 4. The same rim member may be anchored in position so as to leave a rim adjusting space 25 for the rim members, by means of a bolt 26 extending through the rim as 27 and having a hooked end 28 for engaging said side rim member, as shown in Fig. 8 of the drawings.

Referring to Fig. 9 of the drawings, the same or similar hook bolt as shown in Fig. 8 may be used for securing a modified form of movable side rim member 29 so as to leave a take-up or adjusting space 30 between the rim member 29 and the rim member 31, which has an inturned tire flange 32 corresponding with a like flange 33 on the rim member 29. Obviously, by unscrewing the bolt nuts these bolts may be withdrawn sufficiently for turning the hooked end out of the path of movement of the side rim member in mounting and demounting the latter.

It will be seen that the tire adjusting or take-up space is formed between the rim members in all the forms herein shown and described, and that all the clamping devices shown in connection with such forms, afford means for permitting such adjustment.

I do not wish to limit the invention with respect to the side rim member being so shaped as to leave an interval or space between this rim member and a companion rim member to which the side rim member is anchored so as to compensate for the transverse expansion and contraction of the tire, and whereby the latter is held in inflated condition by its own transverse pressure upon said rim members, neither do I wish to be understood as confining myself with respect to the rim clamping devices, nor to the size, shape and material of said devices, but reserve the right to make such changes and variations therein and in rim members, in the manufacture and practical application thereof as may not be inconsistent with the appended claims.

Having thus described my invention what I claim as new and desire to secure by Letters Patent is:

1. In a pneumatic tire rim, a main rim member constituting the tire seat and having a flangeless outer edge, a side member having an annular socket for said edge and affording relative transverse movement of said members under expansion and contraction of a tire, and clamping devices pivoted to the main member opposite the seat for swinging engagement with the socket member opposite the flangeless edge.

2. In a pneumatic tire rim, a main him member constituting the only seat for the tire and having a flanged edge and a flangeless edge, a side rim member having an annular socket fitting around said flangeless edge and a flange corresponding with said flanged edge, and clamping hooks pivoted to said main member and having swinging engagement with the socket member opposite said flangeless edge so as to permit contraction and expansion of said members without releasing the hook.

3. In a pneumatic tire rim, a main rim member constituting a tire seat and having a tire-abutting flange and a flangeless outer edge, a side rim member having a corresponding tire-abutting flange under which is formed an annular socket for said flangeless edge, and hooks having one end pivoted to the main member and a free end for engaging the side member between its flange and the socket so as to permit contraction and expansion of said members.

4. In a pneumatic tire rim, a main rim member having a flanged edge and a flangeless edge, a side rim member having a corresponding flange and walls forming an annular socket for said flangeless edge, pivot bearings secured to the main member, and hooks pivoted with said bearings for engaging the main member flange and the socket portion of the side member for clamping said members together so as to leave a socket space for contraction and expansion of the tire.

In witness whereof I hereunto set my hand in the presence of two witnesses.

UPTON S. LANDERS.

Witnesses:
 GEORGE F. PARSONS,
 A. J. ALEXANDER.